US006671222B2

(12) United States Patent
Wilson et al.

(10) Patent No.: US 6,671,222 B2
(45) Date of Patent: Dec. 30, 2003

(54) APPARATUS AND METHOD FOR DISTRIBUTED CONTROL OF SEISMIC DATA ACQUISITION

(75) Inventors: David Wilson, Missouri City, TX (US); Lawrence Behn, Houston, TX (US); John Downey, Houston, TX (US); Allen James Bishop, Richmond, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 10/167,179

(22) Filed: Jun. 11, 2002

(65) Prior Publication Data

US 2003/0016587 A1 Jan. 23, 2003

Related U.S. Application Data

(60) Provisional application No. 60/297,354, filed on Jun. 11, 2001.

(51) Int. Cl.[7] .............................. G01V 1/22; G01V 1/16; H04B 17/00
(52) U.S. Cl. ............................................. 367/13; 367/76
(58) Field of Search .............................. 367/13, 76, 20, 367/21, 77, 78, 79, 80; 340/825.15

(56) References Cited

U.S. PATENT DOCUMENTS

| 4,023,140 | A |   | 5/1977 | Siems et al. .......... 340/15.5 TS |
| 4,219,810 | A |   | 8/1980 | Joosten ....................... 340/853 |
| 4,398,271 | A |   | 8/1983 | Cretin et al. .................... 367/20 |
| 4,635,237 | A | * | 1/1987 | Benestad et al. ................ 367/20 |
| 4,639,901 | A | * | 1/1987 | Warmack et al. ............... 367/13 |
| 5,303,202 | A |   | 4/1994 | Carroll et al. .................. 367/13 |
| 5,627,798 | A | * | 5/1997 | Siems et al. .................... 367/76 |
| 5,724,241 | A | * | 3/1998 | Wood et al. ..................... 702/14 |

FOREIGN PATENT DOCUMENTS

WO      WO85/01360      3/1985

* cited by examiner

*Primary Examiner*—Ian J. Lobo
(74) *Attorney, Agent, or Firm*—Madan, Mossman & Sriram, P.C.

(57) ABSTRACT

The present invention provides a method and apparatus of acquiring and processing seismic data. One or more controllers are each coupled to seismic sensors and to each other to form a line of data acquisition units. A main controller is coupled to a crossover line unit and to a power supply. Power and data control is distributed among the main controller, the crossover line unit, and each of the plurality of data acquisition units.

51 Claims, 4 Drawing Sheets

APPARATUS AND METHOD FOR DISTRIBUTED CONTROL OF SEISMIC DATA ACQUISITION

This application claims priority from U.S. Provisional Patent Application Ser. No. 60/297,354 filed Jun. 11, 2001.

BACKGROUND OF THE INVENTION

1. Field of the Invention

This invention relates generally geologic surveys and more particularly to an apparatus and method for acquiring and processing seismic data.

2. Description of the Related Art

Conventional geophone and hydrophone systems used in seismic prospecting typically have several sensors that produce signals indicative of a seismic wave. The seismic wave is usually produced by an energy source such as a vibrator truck, explosives or by an air gun in the case of a hydrophone system. These seismic signals are then conducted to acquisition/conversion circuitry. The analog signals from one or more remote seismic sensors (hydrophones, geophones, or other seismic sensors) are sampled and converted to a series of digital values by the acquisition/conversion circuitry. The acquisition/conversion circuitry is typically configurable to, for example, adjust the sampling rate, alter any digital filtering or other digital signal processing parameters, or perform diagnostics.

One or more of these acquisition/conversion circuits are connected to a data collection unit. Each data collection unit collects the series of digital values for all the seismic sensors connected to all the acquisition/conversion units connected to it. The data collection unit passes that data to a system controller, which may include a seismic recording device.

In the conventional system, the system controller initiates the entire system by enabling one or more power sources that provide power throughout the system. A common problem associated with powering a large system is known as galvanic corrosion. Galvanic corrosion occurs when dissimilar metals are provided a voltage potential while in an electrolytic environment. In seismic systems, the sensors, acquisition/conversion units, and usually the data collection units are in wet environments. As a result, the conventional system promotes galvanic corrosion whenever a unit or sensor is not connected at a connector terminal. This reduces the operational life of the connector thereby requiring maintenance at regular intervals.

Another drawback of the conventional system is the time required to recover from corrupted or otherwise unusable data packages transmitted from the data collection units to the main controller recorder.

Another drawback of the conventional system is in the inefficient rate at which data is transmitted alone the system line. Acquisition/conversion circuitry at a distal end of the system send less data over a longer distance of wire, while an acquisition/conversion unit closer to a data acquisition unit typically sends more data over a shorter distance. One skilled in the art would readily recognize that using single data rate for each of these acquisition/conversion units will limit the overall efficiency of the system.

Yet another problem with the conventional system is the centralized control of the system. A centralized controller must provide command and data control for the entire system regardless of the fact that in many instances only one unit may require control at a particular time.

SUMMARY OF THE INVENTION

The present invention addresses the above-identified problems found in the conventional seismic data acquisition system by providing a system having distributed control over the several units comprising the system. Additionally, the present invention provides an apparatus and method for efficiently controlling a seismic data acquisition system.

In one aspect of the present invention provides a seismic data acquisition apparatus comprising a first control unit, a second control unit coupled to the first control unit and to a plurality of seismic sensors, wherein the first control unit is adapted to sense at least one characteristic of the coupling between the first and second control units and to enable operation of the second control unit when the at least one characteristic meets at least one predetermined criterion.

Another aspect of the present invention is a seismic data acquisition system comprising a main control and recording unit, a first control unit coupled to the main control and recording unit a plurality of second control units coupled to the first control unit, wherein each of the plurality of second control units further comprises a seismic sensor coupled to a data acquisition unit and wherein the first control unit is adapted to sense at least one characteristic of the coupling between the first and second control units and to enable operation of the second control unit when the at least one characteristic meets at least one predetermined criterion.

Another aspect of the present invention is a seismic data acquisition apparatus, comprising a first data acquisition unit, a second data acquisition unit coupled to the first data acquisition unit, a power controller operatively associated with the first and second data acquisition units for controlling the propagation of power from the first data acquisition unit to the second data acquisition unit, a logic controller operatively associated with the first and second data acquisition units for controlling data processing and data transmission between the first and second data acquisition units, and at least one seismic sensor operatively associated with each of the first and second data acquisition units for sending a signal indicative of a formation characteristic to the first and second data acquisition units.

Another aspect of the present invention is a method of managing power in a seismic data acquisition system comprising first and second data acquisition units, the method comprising sensing a characteristic of a coupling between the first and second units using a controller in the first unit, and using the first unit to propagate power to the second unit when the characteristic substantially meets a predetermined criterion.

BRIEF DESCRIPTION OF THE DRAWINGS

The novel features of this invention, as well as the invention itself, will be best understood from the attached drawings, taken along with the following description, in which similar reference characters refer to similar parts, and in which.

DETAILED DESCRIPTION OF THE INVENTION

Figure 1:
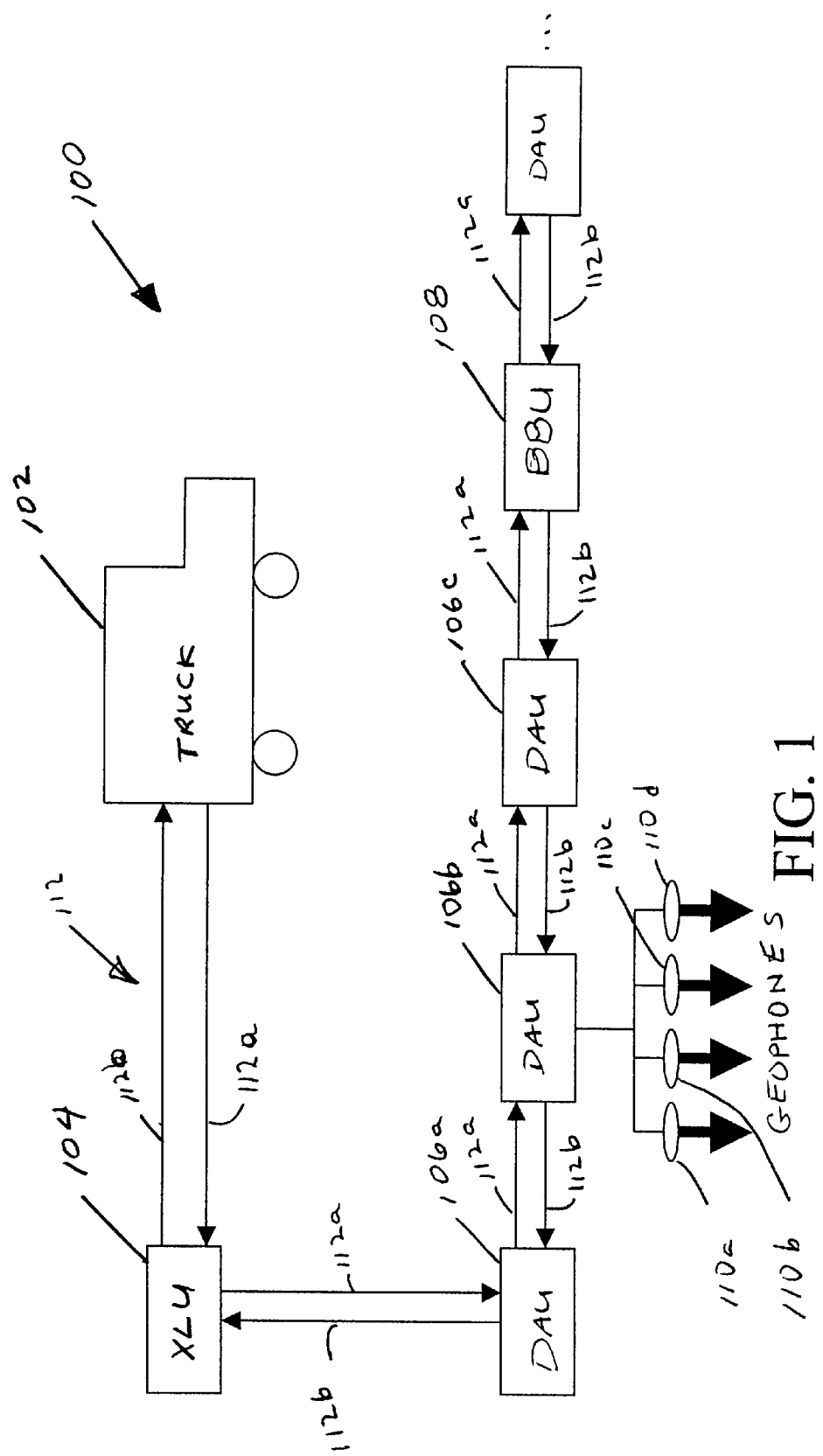
FIG. 1 is a system schematic of one embodiment of a seismic data acquisition system according to the present invention.

FIG. 1 is a system schematic of one embodiment of a seismic data acquisition system according to the present invention. The system 100 includes a primary control and recording unit 102 for delivering commands to and receiving data signals from other units in the system 100. As shown, the primary control and recording unit 102 is a mobile unit known by those skilled in the art as a "truck". Alternatively, the primary control and recording unit may be housed in any vehicle or carrier, or may be semi-permanently installed at a predetermined location.

The primary control and recording unit 102 is coupled to an intermediate unit known as a crossover line unit ("XLU") 104. The XLU 104 is coupled to a plurality of data acquisition units ("DAUs") 106a–e. Quickly referring ahead to FIG. 4, XLUs and DAUs may coupled an alternative fashion. while FIG. 1 shows a simplified series circuit.

Focusing back now on FIG. 1, an optional battery backup unit ("BBU") 108 is shown coupled along a line of DAUs 106a–c. The BBU 108 provides additional power for applications having long system length. With longer system length, electrical power is consumed by the connecting cables. This undesirable effect is known as line loss. A system used for transmitting data signals over long distances of conductive wires must compensate for the effect of line loss. In the embodiment shown, the BBU 108 compensates for such line loss. The BBU includes an internal power source such as a battery. Power from the battery is added to the system to enhance the signals transmitted along the system conductors.

In one embodiment, couplings 112 between the truck and XLU, between the XLU and DAUs, and between each DAU node and sensor are electrically conductive wires 112a and 112b. The wires 112a and 112b are selected to adequately transfer electrical power and data as required by a particular application. Alternatively, the couplings 112 may be any suitable coupling capable of transferring electrical power and data signals. It is not necessary that one coupling 112a be the same coupling type as the other coupling 112b. Exemplary couplings may be any combination of wire, radio frequency, optical fiber, or electromagnetic.

Figure 2:
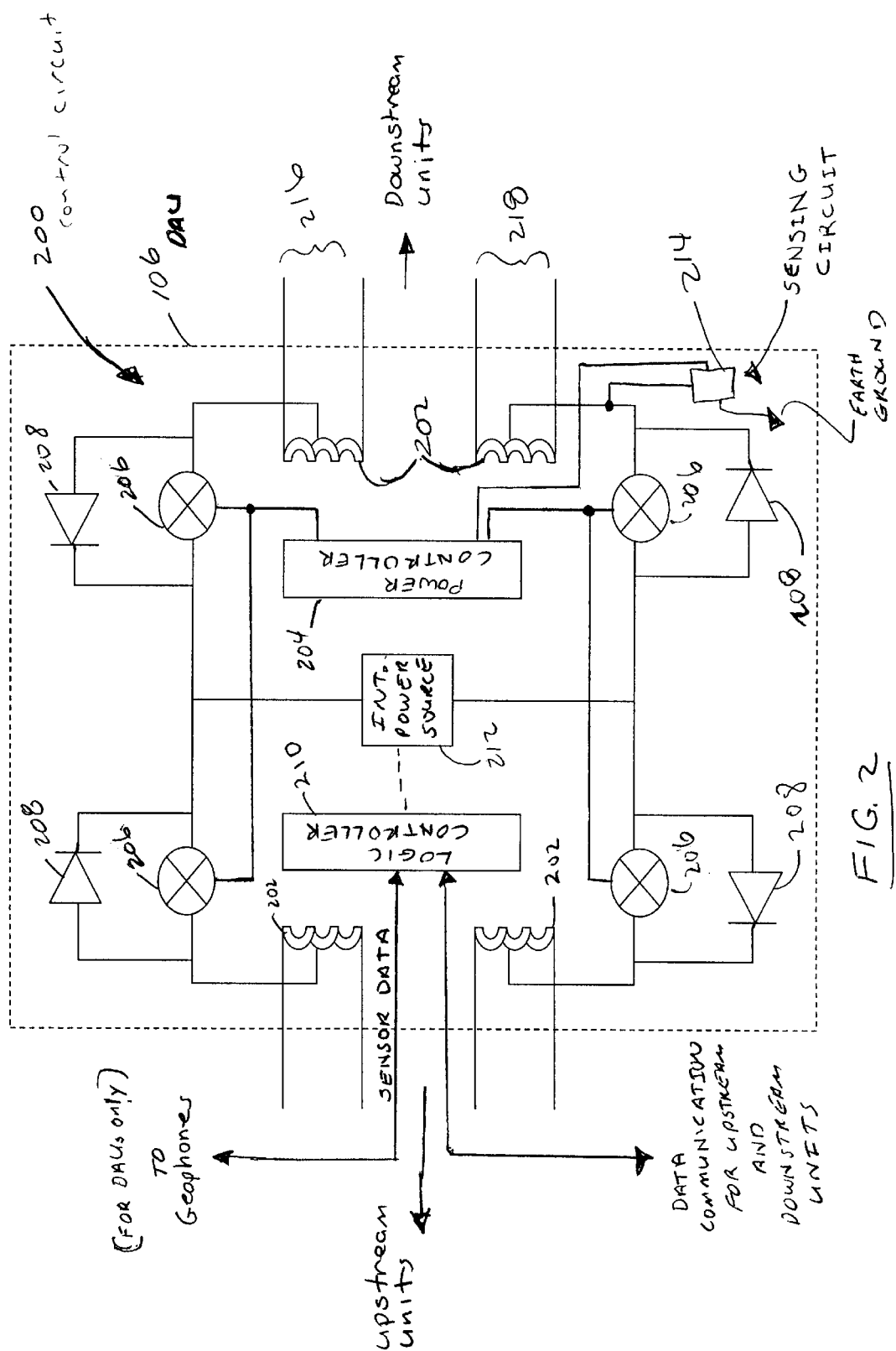
FIG. 2 is a partial schematic of control circuitry found in each of the XLU, DAU and BBU of FIG. 1.

FIG. 2 is a partial schematic of control circuitry 200 found in each of the XLU, DAU and BBU of FIG. 1. Isolating transformers 202a–c are used to couple upstream and downstream units (not shown) to the control circuitry 200. The term "downstream" unit as used herein refers to any system unit-level member electrically farther away from the truck (see 102 of FIG. 1) than the unit 106 containing the control circuitry 200. Likewise, the term "upstream" unit refers to system unit-level member electrically closer to the truck. Furthermore, using a DAU as an exemplary unit does not restrict the control circuitry to a DAU only. To the contrary, this embodiment of present invention includes substantially identical control circuitry in each unit of the system. Additional circuitry would, of course, be necessary to provide the particular functions of, for example, a BBU or an XLU. Likewise these other units would not typically include an interface for sensors.

Figure 3:
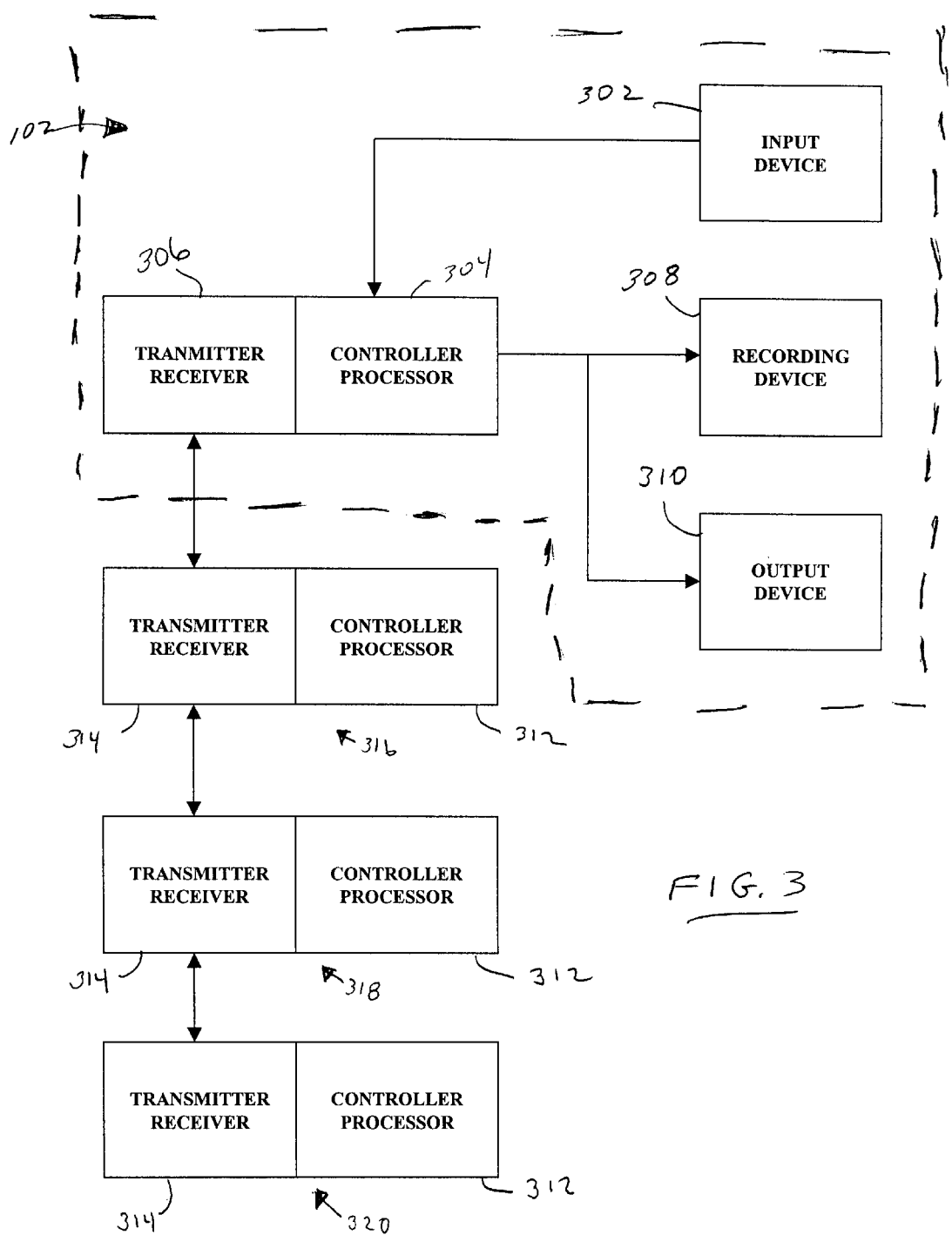
FIG. 3 is a functional block diagram of the system 100 of FIG. 1.

The control circuit 200 includes isolating transformers 202 and a power controller 204 having an internal processor (not separately shown) coupled to electronic switches 206 for managing the propagation of power transfer between an upstream unit and a downstream unit. Current blocking diodes 208 are connected across each electronic switch to ensure proper flow of current through the circuit 200 and on the next unit downstream of the circuit 200. FIG. 3 is a functional block diagram of the system 100 of FIG. 1.

A logic controller 210 having an internal processor (not separately shown) is electrically isolated from the power controller 204. Isolating the two controllers 204 and 210 creates a power domain and a data processing domain. Each unit 106 having a control circuit 200 preferably powers ("wakes-up") in the power domain and then processes data in the data processing domain. If the unit is a DAU 106 as shown in FIG. 2, geophones (see 110a–d in FIG. 1) interface with the logic controller. Signals from the geophones are processed to prepare a data package to be transmitted to the next upstream unit.

The logic controller of each unit (XLU, BBU, DAU) is programmed to receive a data package from the next downstream unit. In the case of a DAU, the DAU processor is also configured to combine a received data package with a data package created from sensor signals directly received by the DAU. The data package (either combined or not) is then retransmitted to the next upstream unit.

Each control circuit 200 also contains an internal power source 212 for maintaining various components such as controller memory and clocks (not separately shown). The internal power source 212 and other components of the control circuit 200 create, in effect, an impedance signature for the particular type of unit. The impedance signature may be different from unit to unit, i.e. XLUs, BBUs and DAUs may each have a unique impedance associated with the unit circuitry.

The impedance of each unit can be used to ensure power is not propagated to the next downstream unit if the next unit is either disconnected or is not operational due to an unknown failure within the unit. The embodiment of FIG. 2 includes a sensing circuit 214 for providing the function just described. The sensing circuit is operationally associated with the power controller 204, and thus operates in the power domain.

The power controller 204 sends a signal to the next unit via an interconnecting cable 216. A second interconnecting cable 218 is used to receive any electrical current returning from the next unit. The sensing circuit 214 converts the returning electrical current to a digital signal. The sensing circuit is connected at its output to an input of the power controller 204. The power controller 204 then processes the sensing circuit output.

The processed output is indicative of the impedance between the interconnecting cables 216 and 218. If the impedance substantially resembles the impedance of a properly functioning unit, then the power controller automatically activates the appropriate switches 206 to propagate power to the next unit. This process is repeated at each unit until the entire line is powered and operational.

FIG. 3 is a functional block diagram of the system 100 of FIG. 1. As shown, the primary control and recording unit 102 includes an input device 302 for user interface. The user interface 302 is preferably electrically connected to a main controller 304. A preferred controller 304 would have a processor for processing commands and data. System commands may be entered by a user or may be stored in memory within the main controller.

The main controller 304 is connected to transmitter and receiver circuits 306 (shown collectively as a transmitter/receiver) and to recording 308 and output 310 devices. Commands are transmitted to and data packages are received from system units via the transmitter/receiver circuits. The processor in the main controller 304 processes received data and transfers signals indicative of the processed data to the recorder 308 for future use, or to the output device 310, which may be a display screen, for immediate use by the user.

Each successive unit, e.g. XLU 316, BBU 318 and DAU 320, downstream of the primary control and recording unit 102 includes controller 312 and transmitter/receiver 314 circuits that are functionally substantially similar to the like circuits in the primary control and recording unit 102.

The commands transmitted from the transmitter/receiver in the primary control and recording unit 102 are received at the XLU 316 transmitter/receiver circuit 314. The XLU controller 312 processes the received commands and may also issue commands stored within the XLU controller. The stored or processed commands and data are transmitted to DAUs 318 and BBUs 320 downstream of the XLU 316 as well as back to the main control unit 102.

A particularly preferred function performed by the XLU 312 is to determine the existence of a viable next unit connected downstream before allowing power to be propagated downstream. The next unit is shown as a DAU, but the next unit could be any of the system units described herein. The XLU delivers a polling signal to determine if a viable DAU is present or connected. If a return signal does not meet certain predetermined characteristics, power will not be transmitted to cables leading to the DAU. This function may be considered as next unit detection.

The benefit of next unit detection is reduction of galvanic corrosion. Galvanic corrosion is a well-known problem in seismic acquisition systems, and is caused by applying power to a connector unconnected at a distal end. This corrosion reduces the useful life of the connector contacts and increases the probability of data corruption when a unit is connected via a connector with corroded terminals.

An XLU controller 312 may also perform a data checking function. When a data package is received at the XLU 316, the XLU controller 312 processes the data package and compares the received package with predetermined expected values. If the received package meets predetermined comparison standards, the data package is retransmitted to the next upstream unit and so on until the data package ultimately reaches the primary control and recording unit 102. In the case of the XLU 316, the next upstream unit is the primary control and recording unit 102. The next upstream unit may be any of the units discussed herein depending upon the particular system configuration and the particular device retransmitting the data package.

If the data package fails to meet the comparison standards, the XLU controller 312 issues a retransmit command to the unit that transmitted the data package to the XLU. In this fashion, the data package ultimately reaching the main control and recording unit 102 has increased reliability.

Still another function carried out by a particular unit in the system such as the XLU 316 is to determine data rate requirements and to adjust the transmitting data rate of the transmitter/receiver 314 before transmitting data packages upstream. Data rate adjustment may be accomplished by selectively enabling conducting paths, or by adjusting the frequency of transmission. This function helps to enhance data transmission by controlling power requirements and lowering error rate of transmitted data.

Yet another function performed by the XLU is path selection. The path selection is accomplished by sensing characteristics of the upstream path and by sensing characteristics of the downstream path using the unit controller 312. When a path is compromised, possibly by a damaged unit or conductor, the controller 312 redirects data flow via an alternate conducting path. Various switching methods are used to accomplish this function as will be discussed in detail with respect to the embodiment shown in FIGS. 4A–B.

Continuing now with FIG. 3, the first unit coupled to the XLU 316 is, for example, a DAU 318. The DAU 318 is shown as a controller coupled to a transmitter receiver much like the XLU described above. Additionally, the DAU 318 includes sensors such as the geophones 106 described above and shown in FIG. 1. The DAU 318 processor receives the geophone signals, processes the signals to create a data package and transmits the data package upstream to the next upstream unit. In this case, the next upstream unit is the XLU 316.

As with the XLU 316, each DAU 318 and BBU 320 performs the functions of next unit detection, path selection, data package checking and request for retransmitting, and data rate adjustment.

An additional function performed at the unit level is the retransmission of data received. As with the XLU 316 described above. Each DAU 318 receiving a data package from downstream checks the data package to ensure the package meets predetermined characteristics before retransmitting the data package. If the data package does not meet standards, the DAU 318 sends a command from the controller via the transmitter to the next down stream unit requesting retransmission of the data package.

As described above with respect to the embodiment of FIG. 1, the BBU provides additional power for applications having long system length. One unique aspect of the present invention is the inclusion in a BBU functional capabilities such as those described above for the XLU 316. The BBU includes a controller 312 and transmitter/receiver 314 for providing the functions of next unit detection, path selection, data package checking and request for retransmitting, and data rate adjustment mentioned above.

Figure 4A:
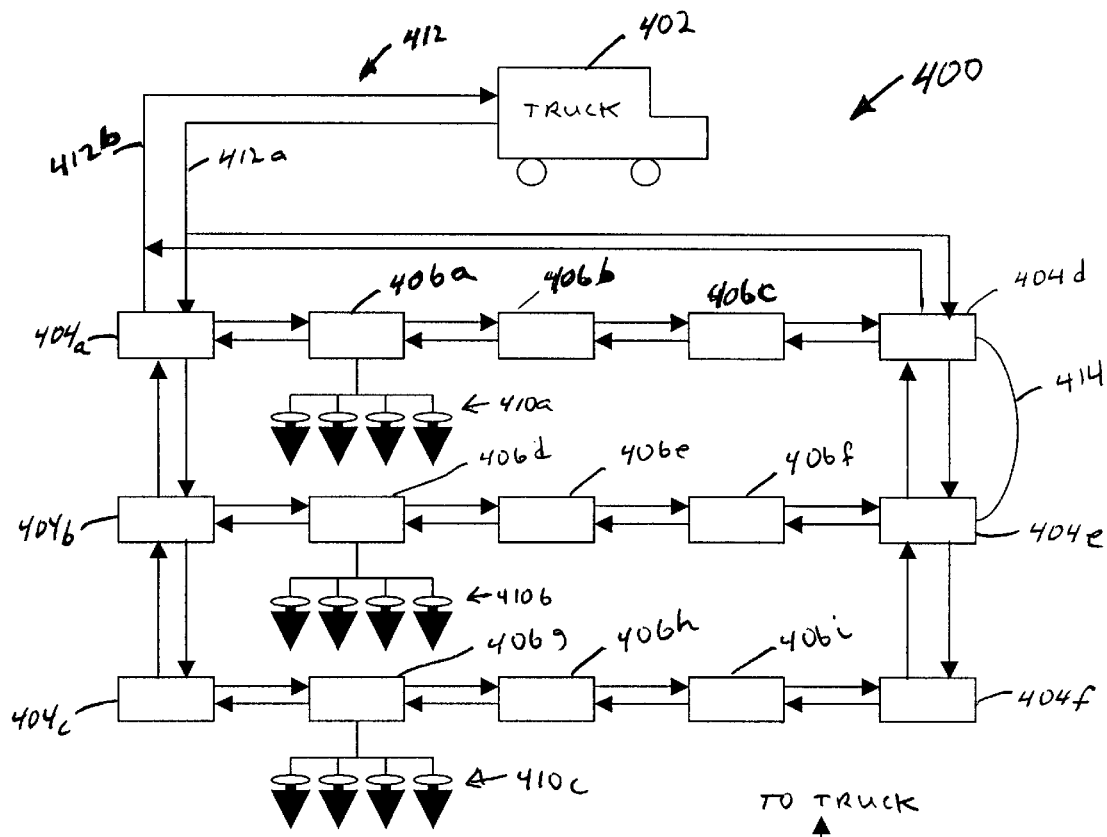
FIG. 4a is another embodiment of a system according to the present invention showing multiple lines of XLUs combined with DAUs.
Figure 4B:
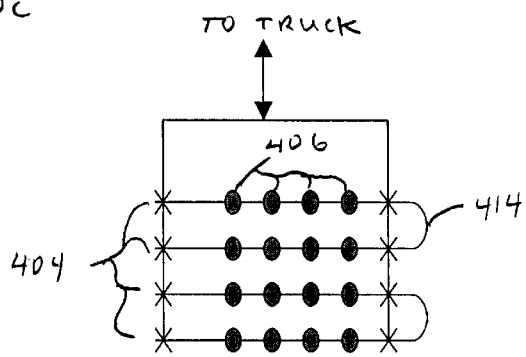
FIG. 4B is a simplified schematic of the system of FIG. 4A.
Figure 1:
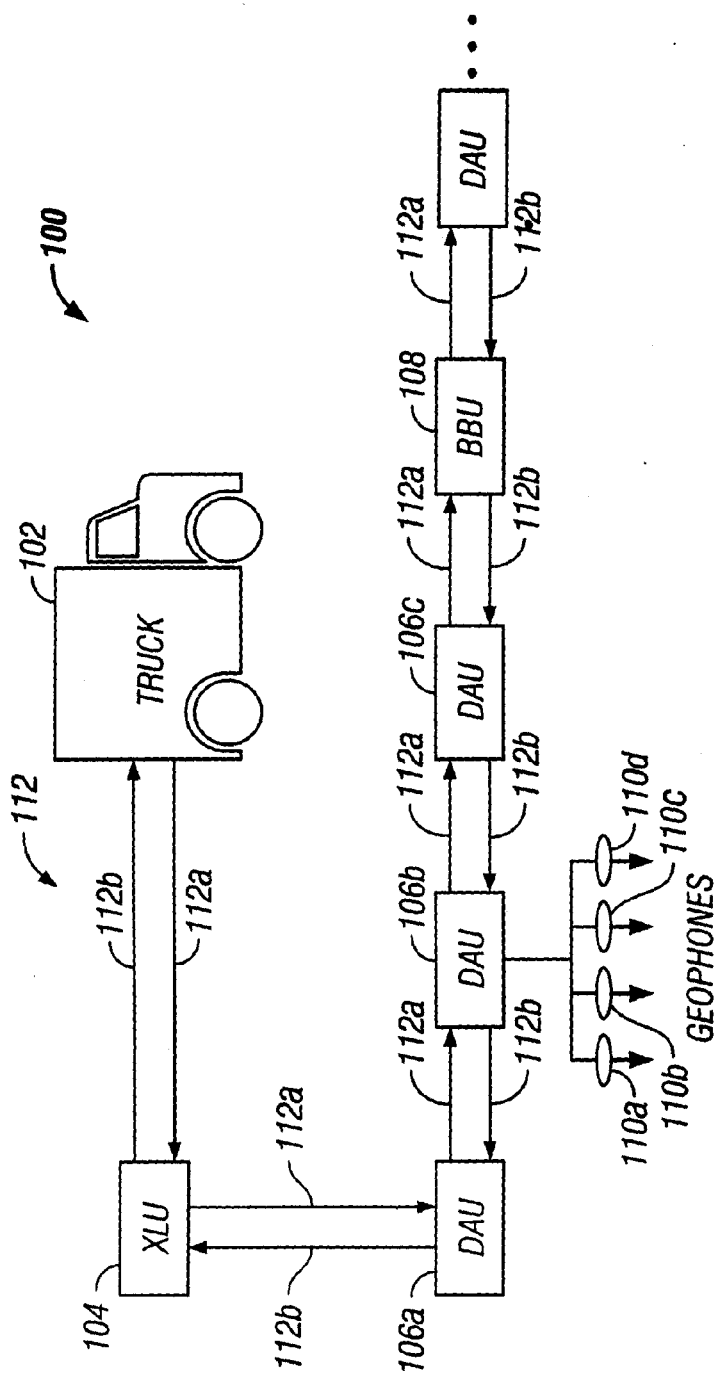
Figure 2:
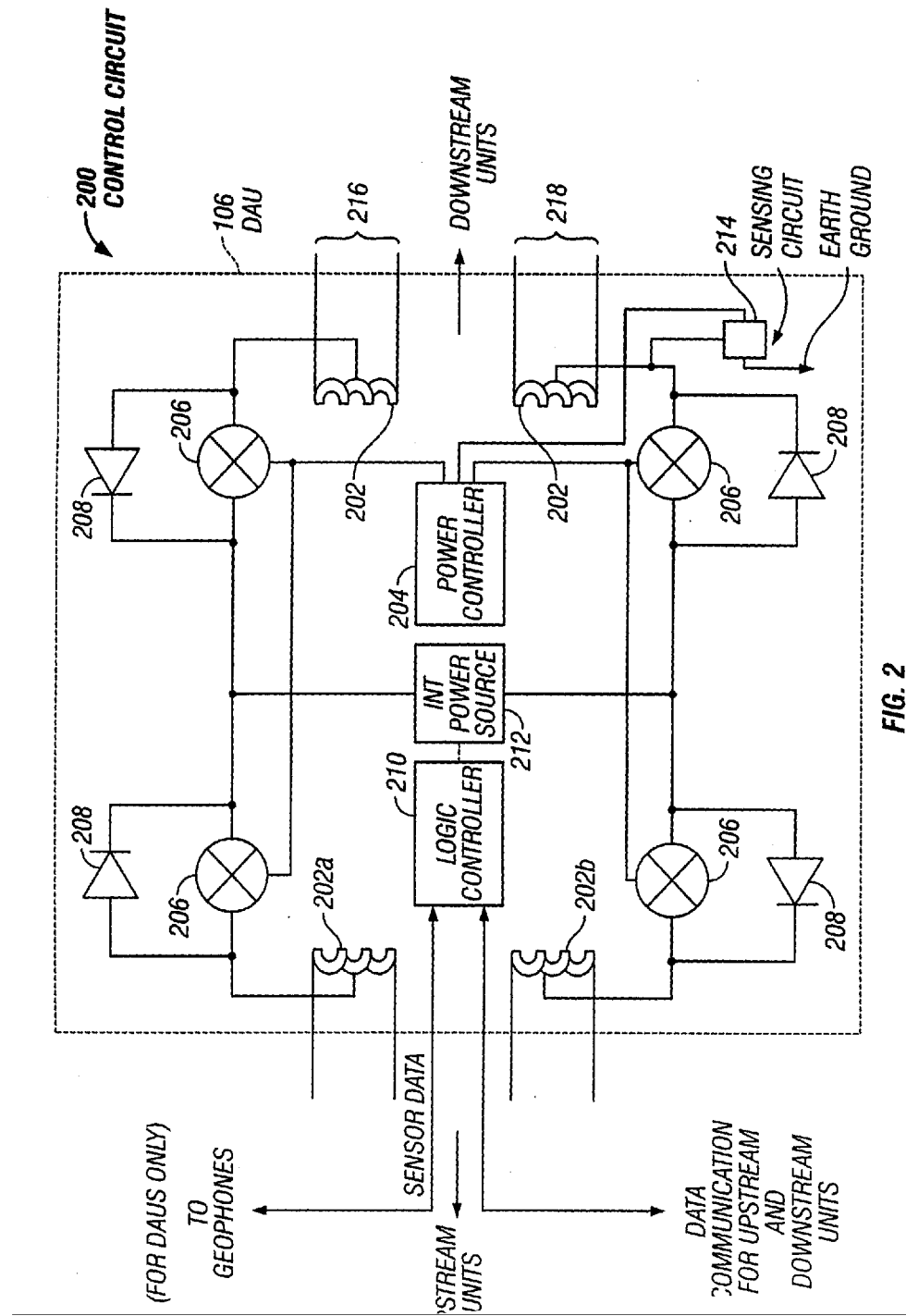
Figure 3:
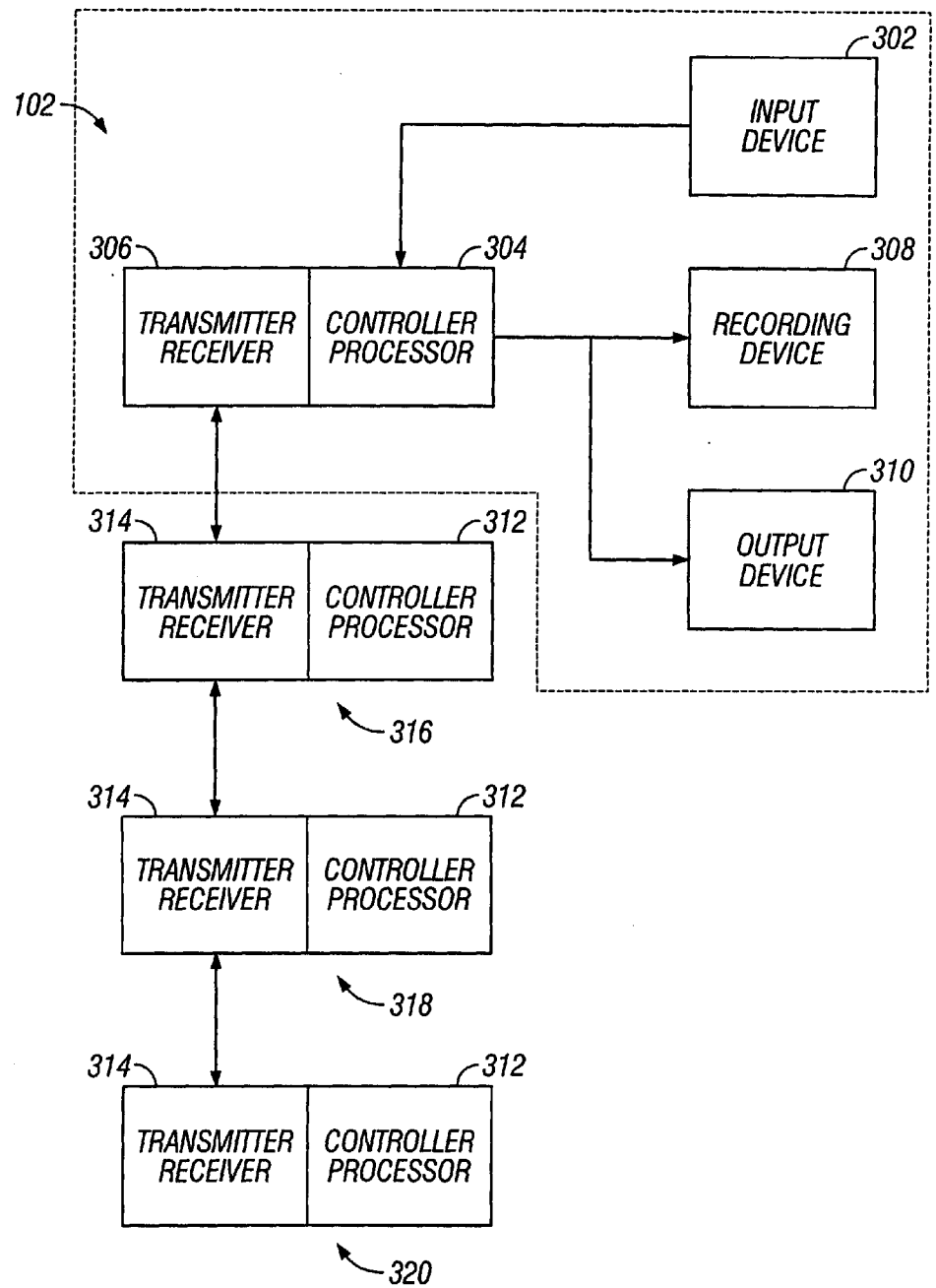
Figure 4A:
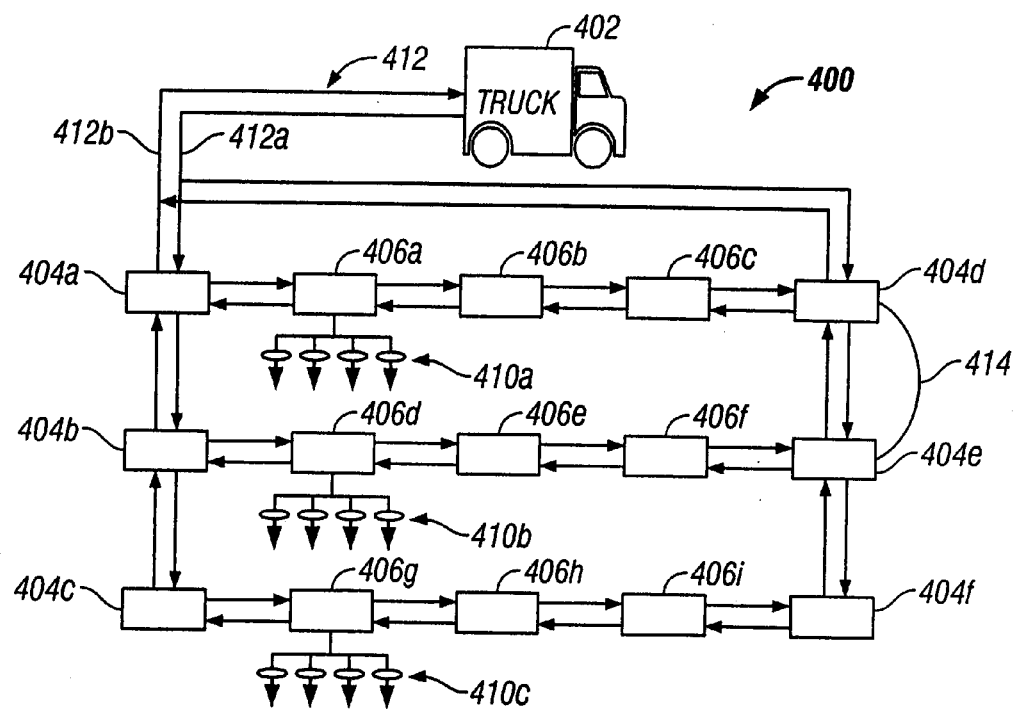
Figure 4B:
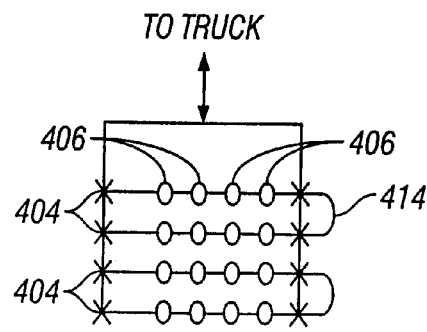

FIG. 4a is another embodiment of a system according to the present invention showing multiple lines of XLUs combined with DAUs. FIG. 4B is a simplified schematic of the system of FIG. 4A. Referring first to FIG. 4A, a truck 402 is coupled in parallel fashion to several lines of XLUs 404 that are series connected to several DAUs 406. As with the embodiment of FIG. 1, each DAU 406*a–i* is coupled to a plurality of seismic sensors 410*a–c*.

Each unit, XLU, DAU, and BBU (not shown) is substantially as described above and shown in FIGS. 2 and 3. The embodiment of FIG. 4 provides added paths for autonomous routing to increase data transmission reliability. The XLUs 404 include additional couplings 414 (only one shown). The coupled XLUs are initially set to a predetermined hierarchy with respect to path selection and commanding. For example, XLUs shown at the left of the figure 404*a*, 404*b*, and 404*c* may initially be designated as primary XLUs. The designation meaning that any such designated XLU will be activated first from the truck 402 and will be the primary source for command and data communication to the associated line of DAUs. The additional coupling 414 between XLUs allows for a primary XLU to be automatically switch to becoming designated a back-up XLU or even disengaged from the circuit altogether by a unit polling the primary XLU.

As the system is initially powered, the next unit detection function described earlier is utilized to determine health of the first XLU designated as primary XLU. If that XLU is determined functional, then the power sequence continues according to the predetermined hierarchy. If a primary XLU is found nonfunctional during power-up, then an alternate route may be designated by internal switching to another XLU via the coupling 414.

Those skilled in the art having the benefit of this disclosure would also recognize that the scope of autonomous routing would also encompass autonomous routing of data package transmission. Likewise, the use of an XLU by way of example does not limit the autonomous routing function to an XLU only. Any unit polling a next unit may reroute transmission.

Generically, a unit will poll for next unit detection during wake-up or data transmission operations prior to transmitting power or data. The poll signal will be detected by a sensing circuit such as the circuit 214 described above and shown in FIG. 2 for determining the health of the receiving unit. If the receiving unit is unavailable, then the transmitting unit autonomously reroutes to another unit.

The method of the present invention may be practiced using any of the embodiments described above and shown in FIGS. 1–4B. The method includes power management of a seismic data acquisition system. Power management includes a wake-up process, power isolation, failure isolation, common mode noise reduction, and signal balancing.

The wake-up process is a according to the present invention is sequentially establishing power at each available unit in a system without applying power to connectors not having a viable unit connected thereto. A viable unit is a properly connected unit having an impedance signature exhibiting characteristics meeting predetermined criteria. As discussed above, a polling signal is transmitted from a first unit to a second unit. The signal on a return line is indicative of the existence or nonexistence of a viable unit downstream of the unit sensing the signal. If the second unit is a viable unit, power is propagated to the second unit to "wake" the second unit. The second unit then operates as a first unit to poll the next unit now a second unit and so on until all units are powered. Once all units are powered, seismic sensing and processing circuits are enabled to conduct seismic data acquisition.

Fast-line wakeup is another embodiment of the method of the present invention wherein the wake-up embodiment is enhanced by near-simultaneous wake-up and logic controller activation. In this embodiment a wake-up process is initiated sequentially as described above. In the fast-line wakeup, the logic controller in a particular unit is activated as soon as that particular unit becomes the first unit or "polling" unit. In this embodiment the logic controllers of each of the several units is activated with only a few micro-seconds of lag time behind the wake-up of the unit. When the last viable unit in the system is powered, all logic controllers are enabled and ready to process and send data packages immediately after the last unit is powered.

One skilled in the art would immediately conclude with the benefit of this disclosure that the fast wake-up process could be made to include substantially simultaneous logic controller enabling upon wake-up of a particular unit. A preferred process, however, would include determining whether a particular unit has been polled previously, and recognized as a failed unit in a previous wake-up or fast wake-up process. This additional determination operates to increase power efficiency and to reduce start-up time by not polling the unit again. This embodiment may be practiced using a power-next bit within the processor in each unit power controller.

When a polling unit determines the existence of a next unit, yet the next unit fails to meet viable unit criteria as discussed above, then the power-next bit of the first unit is set to a value indicating that a non-viable unit exists downstream.

Every time a unit is powered and begins the polling process, the first unit checks its power-next bit. If the bit has the value indication past problem, the unit automatically ignores the rest of the process and begins operation without propagating a polling signal and without sensing and processing the return signal.

In this embodiment there is no attempt to power the second unit. Thus, power is isolated to only those units considered viable. A particularly advantageous effect of using this embodiment is realized when the problem causing the initial bit to be set is current leakage or complete short circuit beyond the polling unit. Without propagating power or signals beyond the polling unit, additional failures possibly caused by excessive current are avoided in addition to the advantage of decreasing system start time.

Another process contemplated by the method of the present invention is the process of failure isolation. Failures can be detected as existing beyond the point of a properly operating unit if the apparatus of the present invention is used. As discussed above box characteristics, i.e. impedance signature of a viable unit can be determined at the unit level of the next upstream unit. The signature of a particular unit is substantially constant during operation unless something happens to change the characteristics. Characteristics are changed primarily by component degradation or failure. One particularly common failure is cable failure caused by degradation of the insulation surrounding the cable. Current leakage through degraded insulation tends to corrupt data at an increasing rate until the cable completely shorts to ground causing total loss of data.

DAUs are typically constant power devices. If a power cable degrades, current leakage to ground reduces the voltage thereby causing an automatic increase in current required to maintain constant power. At some point, there will be a total power collapse where the power source simply cannot provide required current and the system will no longer operate.

In this embodiment of the current invention, each unit along the system line autonomously monitors a line characteristic such as voltage. If a cable begins to degrade, the first unit upstream of the point of degradation will sense the potential or actual failure. The sensing unit power controller halts power propagation on the cable exhibiting the degradation or failure to prevent total system collapse.

The method of the present invention also includes processes for managing data transfer along the system to increase reliability of data received at the primary control and recording unit and to increase efficiency of the system as a whole.

In one process autonomous routing is used to increase data transmission reliability. Autonomous routing is accomplished using the apparatus of the present invention. Referring for example to the apparatus embodiments of FIGS. 1 through 4B, each unit (XLU and DAU) in the system has the capability to sense characteristics of upstream and downstream units using a sensing circuit such as the sensing circuit 214 of FIG. 2. The processor of the unit controller is used to determine the viability of a selected data route between a DAU 106a and another DAU 106b, between a DAU and a BBU 108, between a DAU 106a and an XLU 104, or between various combinations of units such as would be possible with the embodiment of FIGS. 4a–4b.

A primary data route is selected at system wake-up. If the selected route is not viable due to some degradation of the route, the unit sensing the non-viable route autonomously selects an alternate route by sending a command to other viable units in the system. Each viable unit then uses its power and logic controllers to automatically switch data routing an alternative route.

The number of alternative routes available is a function of the particular system architecture. The apparatus embodiment of FIGS. 4a–4b described above would have many alternative routes available, whereas the single string system of FIG. 1 may have only a primary route and a secondary route between any two units.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

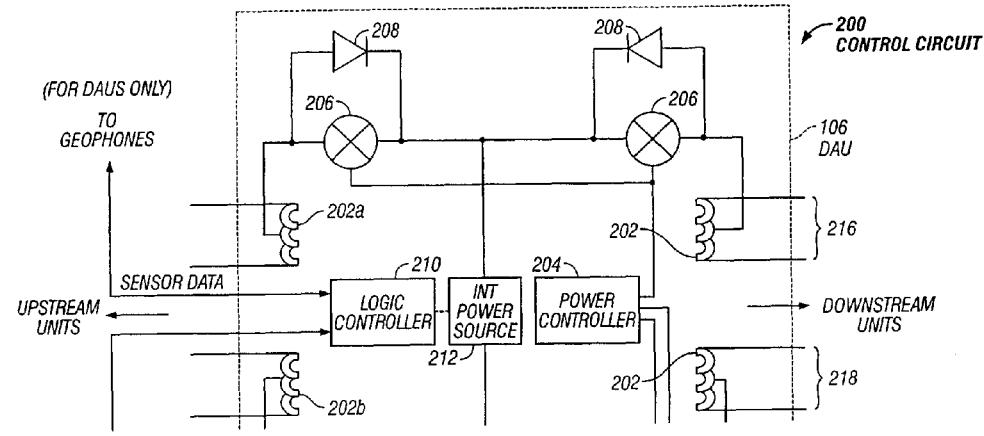

What is claimed is:

1. A distributed control seismic data acquisition apparatus comprising:
   a) a first control unit for controlling a first portion of a seismic data acquisition operation; and
   b) at least one second control unit coupled to the first control unit, the at least one second control unit controlling a second portion of the seismic data acquisition operation;
   wherein the first control unit and the at least one second control unit include circuits for sensing at least one characteristic of the coupling between the first control unit and the at least one second control unit and in response to said sensed characteristic said first control unit and said at least one second control unit autonomously controlling the first portion and second portion of the seismic data acquisition operation.

2. The apparatus of claim 1, further comprising c) a plurality of seismic sensors coupled to the at least one second control unit, the sensors being selected from a group consisting of geophones and hydrophones.

3. The apparatus of claim 1, wherein the coupling between the first control unit and at least one second control unit is an electrical coupling and the at least one characteristic is an electrical impedance response.

4. The apparatus of claim 3, wherein the at least one second control unit further comprises a connector and the coupling between the first control unit and at least one second control unit includes an electrically conductive wire and a terminal for providing a selectively connectable electrical path from the first control unit to the second control unit.

5. The apparatus of claim 4, wherein the electrical impedance response is indicative of at least one of existence and health of the second control unit connected to the terminal.

6. The apparatus of claim 3, wherein the electrical impedance response is indicative of an electrical fault in the coupling.

7. The apparatus of claim 1 further comprising at least one electrical power supply unit for providing electrical power to the first control unit and wherein the first control unit enables the at least one second control unit by propagating the electrical power to the second control unit.

8. The apparatus of claim 1 further comprising a transmitter disposed in the first control unit for transmitting a first signal to the second control unit and a receiver disposed in the first control unit for receiving a second signal, wherein the second signal is indicative of the at least one characteristic.

9. The apparatus of claim 1 further comprising:
   i) a plurality of conductor paths coupling the at least one second control unit to the first control unit;
   ii) a transmitting circuit in the control unit for sending a test signal along a first conductor path of the plurality of conductor paths;
   iii) a receiving circuit for receiving a return signal from the first conductor path, the return signal being indicative of a characteristic of the first conductor path; and
   iv) a switching circuit for selecting a second conductor path of the plurality of conductor paths in response to the return signal and based on a predetermined criterion.

10. The apparatus of claim 1 further comprising:
   i) a first circuit in the at least one second control unit for determining a data load capacity; and
   ii) a second circuit operatively coupled to the at least one second control unit for adjusting data rate.

11. The apparatus of claim 10, wherein the second circuit adjusts data transmission rate.

12. The apparatus of claim 10, wherein the second circuit adjusts data rate by enabling additional conductor paths.

13. The apparatus of claim 1 wherein the first portion of the seismic data acquisition operation controlled by the first control unit includes at least one of power distribution, data processing, data routing, and data transmission.

14. The apparatus of claim 1, wherein the at least one second control unit is a plurality of seismic data acquisition units, each seismic data acquisition unit including a power domain operating mode and a processing domain operating mode.

15. The apparatus of claim 14, wherein each data acquisition unit activates in the power domain operating mode prior to activating in the processing domain operating mode.

16. The apparatus of claim 1, wherein the sensed characteristic is the existence of a next unit and wherein electrical power is distributed along the coupling upon said sensing of the existence of the next unit.

17. The apparatus of claim 1, wherein the sensed characteristic is the existence of a next unit an impedance signature of the next unit and wherein electrical power is distributed along the coupling upon said sensing of the existence of the next unit and upon sensing of a predetermined impedance signature.

18. The apparatus of claim 14, wherein each of the plurality of seismic data acquisition units includes a power isolation circuit.

19. A seismic data acquisition system comprising:
   a) a main control and recording unit;
   b) a first control unit coupled to the main control and recording unit for controlling a first portion of a seismic data acquisition operation; and
   c) at least one second control unit coupled to the first control unit, the at least one second control unit controlling a second portion of the seismic data acquisition operation;
   wherein the first control unit and the at least one second control unit include circuits for sensing at least one characteristic of the coupling between the first control unit and the at least one second control unit and in response to said sensed characteristic said first control unit and said at least one second control unit autonomously controllina the first portion and second portion of the seismic data acquisition operation.

20. The system of claim 19, further comprising a plurality of seismic sensors coupled to the at least one second control unit, the sensors being selected from a group consisting of geophones and hydrophones.

21. The system of claim 19, wherein the coupling between the first control unit and at least one second control unit is an electrical coupling and the at least one characteristic is an electrical impedance response.

22. The system of claim 21, wherein the at least one second control unit further comprises a connector and the coupling between the first control unit and at least one second control unit includes an electrically conductive wire and a terminal for providing a selectively connectable electrical path from the first control unit to the second control unit.

23. The system of claim 22, wherein the electrical impedance response is indicative of at least one of existence and health of the second control unit connected to the terminal.

24. The system of claim 21, wherein the electrical impedance response is indicative of an electrical fault in the coupling.

25. The system of claim 19 further comprising at least one electrical power supply unit for providing electrical power to the first control unit and wherein the first control unit enables the at least one second control unit by propagating the electrical power to the second control unit.

26. The system of claim 19 further comprising a transmitter disposed in the first control unit for transmitting a first signal to the second control unit and a receiver disposed in the first control unit for receiving a second signal, wherein the second signal is indicative of the at least one characteristic.

27. The system of claim 19 further comprising:
i) a plurality of conductor paths coupling the at least one second control unit to the first control unit;
ii) a transmitting circuit in the control unit for sending a test signal along a first conductor path of the plurality of conductor paths;
iii) a receiving circuit for receiving a return signal from the first conductor path, the return signal being indicative of a characteristic of the first conductor path; and
iv) a switching circuit for selecting a second conductor path of the plurality of conductor paths in response to the return signal and based on a predetermined criterion.

28. The system of claim 19 further comprising:
i) a first circuit in the at least one second control unit for determining a data load capacity; and
ii) a second circuit operatively coupled to the at least one second control unit for adjusting data rate.

29. The system of claim 28, wherein the second circuit adjusts data transmission rate.

30. The system of claim 28, wherein the second circuit adjusts data rate by enabling additional conductor paths.

31. The system of claim 19, wherein the first portion of the seismic data acquisition operation controlled by the first control unit includes at least one of power distribution, data processing, data routing, and data transmission.

32. The system of claim 19, wherein the at least one second control unit is a plurality of seismic data acquisition units, each seismic data acquisition unit including a power domain operating mode and a processing domain operating mode.

33. The system of claim 32, wherein each data acquisition unit activates in the power domain operating mode prior to activating in the processing domain operating mode.

34. The system of claim 19, wherein the sensed characteristic is the existence of a next unit and wherein electrical power is distributed along the coupling upon said sensing of the existence of the next unit.

35. The system of claim 19, wherein the sensed characteristic is the existence of a next unit an impedance signature of the next unit and wherein electrical power is distributed along the coupling upon said sensing of the existence of the next unit and upon sensing of a predetermined impedance signature.

36. The system of claim 32, wherein each of the plurality of seismic data acquisition units includes a power isolation circuit.

37. A seismic data acquisition apparatus, comprising:
a) a first data acquisition unit;
b) a second data acquisition unit coupled to the first data acquisition unit;
c) a power controller operatively associated with the first and second data acquisition units for controlling the propagation of power from the first data acquisition unit to the second data acquisition unit;
d) a logic controller operatively associated with the first and second data acquisition units for controlling data processing and data transmission between the first and second data acquisition units, wherein the logic controller is isolated from the power controller. the power controller operating in a power domain and the logic controller operating in a data processing domain; and
e) at least one seismic sensor operatively associated with each of the first and second data acquisition units for sending a signal indicative of a formation characteristic to the first and second data acquisition units.

38. A method of distributed control of a seismic data acquisition system, the seismic data acquisition system comprising a first control unit, at least one second control unit coupled to the first control unit and a plurality of seismic sensors coupled to the at least one second control unit, the method comprising:
a) sensing at least one characteristic of the coupling between the first control unit and the at least one second control unit; and
b) in response to said sensed characteristic controlling a first portion of the seismic data acquisition operation with said first control unit and controlling a second portion of the seismic data acquisition operation with at least one second control unit.

39. The method of claim 38, wherein the coupling between the first control unit and at least one second control unit is an electrical coupling and wherein sensing at least one characteristic is sensing an electrical impedance response.

40. The method of claim 39, wherein the electrical impedance response is indicative of at least one of existence and health of the second control unit.

41. The method of claim 39, wherein the electrical impedance response is indicative of an electrical fault in the coupling.

42. The method of claim 38 further comprising:
i) providing electrical power to the first control unit using at least one electrical power supply unit for electrical; and
ii) enabling the at least one second control unit by propagating the electrical power to the second control unit from the first control unit.

43. The method of claim 38 further comprising:
i) transmitting a first signal to the second control unit using a transmitter disposed in the first control unit; and
ii) receiving a second signal using a receiver disposed in the first control unit, the second signal indicative of the at least one characteristic for transmitting a first signal to the second control unit.

44. The method of claim 38, wherein a plurality of conductor paths couple the at least one second control unit to the first control unit, the method further comprising:
i) sending a test signal along a first conductor path of the plurality of conductor paths using a transmitting circuit in the first control unit;

ii) receiving a return signal from the first conductor path using a receiving circuit in the first control unit, the return signal being indicative of a characteristic of the first conductor path; and iii) selecting a second conductor path of the plurality of conductor paths in response to the return signal and based on a predetermined criterion using a switching circuit in the first control unit.

45. The method of claim 38 further comprising:

i) determining a data load capacity using a first circuit in the at least one second control unit; and ii) adjusting data rate in response to the determined data load capacity using a second circuit operatively coupled to the at least one second control unit.

46. The method of claim 45, wherein adjusting data rate includes adjusting a data transmission rate.

47. The method of claim 45, wherein adjusting data rate includes enabling additional conductor paths.

48. The method of claim 38, wherein the first portion of the seismic data acquisition operation controlled by the first control unit includes at least one of power distribution, data processing, data routing, and data transmission.

49. The method of claim 38, wherein the at least one second control unit is a plurality of seismic data acquisition units, each seismic data acquisition unit including a power domain operating mode and a processing domain operating mode, the method further comprising activating each data acquisition unit in the power domain operating mode prior to activating in the processing domain operating mode.

50. The method of claim 38, wherein the sensed characteristic is the existence of a next unit, the method further comprising distributing electrical power along the coupling upon said sensing of the existence of the next unit.

51. The method of claim 38, wherein the sensed characteristic is the existence of a next unit an impedance signature of the next unit, the method further comprising distributing electrical power along the coupling upon said sensing of the existence of the next unit and upon sensing of a predetermined impedance signature.

* * * * *

UNITED STATES PATENT AND TRADEMARK OFFICE
CERTIFICATE OF CORRECTION

PATENT NO. : 6,671,222 B2
DATED : December 30, 2003
INVENTOR(S) : Wilson et al.

It is certified that error appears in the above-identified patent and that said Letters Patent is hereby corrected as shown below:

Title page showing an illustrative figure should be deleted and replaced with the attached title page.

<u>Drawings,</u>
Replace figs. 1 thru 4b with the attached figs. 1 thru 4b

Signed and Sealed this

Twentieth Day of April, 2004

JON W. DUDAS
*Acting Director of the United States Patent and Trademark Office*

(12) United States Patent  
Wilson et al.

(10) Patent No.: US 6,671,222 B2  
(45) Date of Patent: Dec. 30, 2003

(54) APPARATUS AND METHOD FOR DISTRIBUTED CONTROL OF SEISMIC DATA ACQUISITION

(75) Inventors: David Wilson, Missouri City, TX (US); Lawrence Behn, Houston, TX (US); John Downey, Houston, TX (US); Allen James Bishop, Richmond, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 10/167,179

(22) Filed: Jun. 11, 2002

(65) Prior Publication Data

US 2003/0016587 A1 Jan. 23, 2003

Related U.S. Application Data

(60) Provisional application No. 60/297,354, filed on Jun. 11, 2001.

(51) Int. Cl.$^7$ .......................... G01V 1/22; G01V 1/16; H04B 17/00
(52) U.S. Cl. .......................................... 367/13; 367/76
(58) Field of Search ........................ 367/13, 76, 20, 367/21, 77, 78, 79, 80; 340/825.15

(56) References Cited

U.S. PATENT DOCUMENTS

| 4,023,140 A | | 5/1977 | Siems et al. ......... 340/15.5 TS |
| 4,219,810 A | | 8/1980 | Joosten .................... 340/853 |
| 4,398,271 A | | 8/1983 | Cretin et al. ................ 367/20 |
| 4,635,237 A | * | 1/1987 | Benestad et al. ........... 367/20 |
| 4,639,901 A | * | 1/1987 | Warmack et al. ........... 367/13 |
| 5,303,202 A | | 4/1994 | Carroll et al. .............. 367/13 |
| 5,627,798 A | * | 5/1997 | Siems et al. ................ 367/76 |
| 5,724,241 A | * | 3/1998 | Wood et al. ................ 702/14 |

FOREIGN PATENT DOCUMENTS

WO          WO85/01360        3/1985

* cited by examiner

*Primary Examiner*—Ian J. Lobo  
(74) *Attorney, Agent, or Firm*—Madan, Mossman & Sriram, P.C.

(57) ABSTRACT

The present invention provides a method and apparatus of acquiring and processing seismic data. One or more controllers are each coupled to seismic sensors and to each other to form a line of data acquisition units. A main controller is coupled to a crossover line unit and to a power supply. Power and data control is distributed among the main controller, the crossover line unit, and each of the plurality of data acquisition units.

51 Claims, 4 Drawing Sheets